United States Patent [19]

Czirr

[11] Patent Number: 5,313,504
[45] Date of Patent: May 17, 1994

[54] NEUTRON AND PHOTON MONITOR FOR SUBSURFACE SURVEYING

[75] Inventor: John B. Czirr, Mapleton, Utah

[73] Assignees: David B. Merrill, Salt Lake City; J. L. Carroll, Bountiful; Shanna Lee Czirr, Mapleton, all of Utah ; a part interest to each

[21] Appl. No.: 964,966

[22] Filed: Oct. 22, 1992

[51] Int. Cl.$^5$ ........................... G01T 3/00; G01V 5/00

[52] U.S. Cl. .................... 376/153; 376/159; 376/166; 250/270; 250/483.1

[58] Field of Search ............... 376/153, 159, 166, 254; 250/269, 270, 361 R, 363.01, 390.01, 483.1

[56] References Cited

U.S. PATENT DOCUMENTS

| | | | |
|---|---|---|---|
| 3,579,016 | 5/1971 | Palilla | 252/301.4 R |
| 4,185,201 | 1/1980 | Stevels | 250/483.1 |
| 4,280,048 | 7/1981 | Smith | 250/269 |
| 4,317,993 | 3/1982 | Hertzog, Jr. et al. | 250/270 |
| 4,466,929 | 8/1984 | Greskovich et al. | 264/1.2 |
| 4,466,930 | 8/1984 | Greskovich et al. | 264/1.2 |
| 4,473,513 | 9/1984 | Cusano et al. | 264/1.2 |
| 4,518,545 | 5/1985 | Cusano et al. | 264/1.2 |
| 4,647,781 | 3/1987 | Takagi et al. | 250/483.1 |
| 4,747,973 | 5/1988 | Cusano et al. | 252/301.4 R |
| 4,883,956 | 11/1989 | Melcher et al. | 250/269 |
| 4,916,320 | 4/1990 | Wunderly et al. | 250/483.1 |
| 4,958,080 | 9/1990 | Melcher | 250/483.1 |
| 4,988,882 | 1/1991 | Francois et al. | 250/483.1 |
| 5,008,067 | 4/1991 | Czirr | 376/159 |
| 5,015,860 | 5/1991 | Moses | 250/361 R |
| 5,025,151 | 6/1991 | Melcher | 250/269 |

OTHER PUBLICATIONS

"The Afterglow of Some Old and New Ce$^{3+}$-Activated Phosphors" by Gomes de Mesquita et al., *Journal of The Electrochemical Society*, 116 (1969) 871.

"YAlO$_3$: Ce-fast-acting scintillators for detection of ionizing radiation" by Baryshevsky et al., Nuclear Instruments and Methods in Physics Research B58 (1991) pp. 291–293.

"Investigation of Some Ce$^{3+}$-Activated Phosphors" by Blasse et al., The Journal of Chemical Physics, vol. 47, No. 12, Dec. 15, 1967, pp. 5139–5145.

"Anomalously small 4f-5d oscillator strengths and 4f—4f electronic Raman scattering cross sections for Ce$^{3+}$ in crystals of LuPO$_4$" by Williams et al., Physical Review B, V. 40, N. 6, Aug. 15, 1989.

"Intensities of electronic Raman scattering between crystal-field levels of Ce$^{3+}$ in LuPO$_4$: Nonresonant and near-resonant excitation" by Williams et al., Physical Review B, V. 40, N. 6, Aug. 15, 1989.

"Synthesis and Single-Crystal Growth of Rare-Earth Orthophosphates" by Feigelson, Journal of The American Ceramic Society, vol. 47, No. 5, May 1964, pp. 257–258.

"Czochralski Growth of Rare-Earth Orthosilicates (Ln$_2$SiO$_5$)" by Brandle et al., Journal of Crystal Growth 79 (1986) 308–315.

"Cerium-doped Lutetium Oxyorthosilicate: A Fast, Efficient New Scintillator" by Melcher et al., IEEE, Trans. on Nuclear Science, vol. 39, No. 4, 1992, pp. 502–505.

"A Highly Energy-Selective Activation Detector For Pulsed Fusion Neutron Sources", by Howell, Nuclear Instruments and Methods 148 (1978) 39–42.

"Radioluminescence and Scintillation Properties of Monocrystals of Silicates of Yttrium and Rare Earth Elements", A. P. Kulesskii et al., Journal of Applied Spectroscopy 48, 446 (1988).

*Primary Examiner*—Daniel D. Wasil
*Attorney, Agent, or Firm*—Foley & Lardner

[57] ABSTRACT

An apparatus to survey subsurface formations includes a sonde which is configured to move through a borehole. The sonde includes a neutron generator that emits neutrons into the subsurface formations. A crystal detector connected to the sonde monitors the neutron output of the neutron generator. The crystal detector can comprise an yttrium silicate crystal, an yttrium aluminate crystal, a lanthanum phosphate crystal, or a lutetium phosphate crystal. A lanthanum phosphate crystal or a lutetium phosphate crystal can also be used to detect photons coming from the subsurface formations. The sonde pressure casing can be fabricated from borated stainless steel to shield the internals of the sonde from thermal neutrons.

17 Claims, 1 Drawing Sheet

NEUTRON AND PHOTON MONITOR FOR SUBSURFACE SURVEYING

BACKGROUND OF THE INVENTION

The invention is directed toward subsurface surveying such as well logging. More particularly, the invention is directed to improved neutron and photon detectors for subsurface surveying applications. The term "photon" as used herein includes both gamma rays and X-rays.

Nuclear techniques have been extensively applied to oil exploration, particularly in the area of well logging. Nuclear particle detectors are used to find strata containing oil and natural gas. These investigations can estimate the extent of fuel-bearing strata and the amount of fuel that these strata contain.

The scientific basis for this survey technique is based on the fact that different materials undergo different reactions when irradiated with neutrons. After a stratum is irradiated with neutrons, photons and/or neutrons returning from the stratum are detected to obtain information regarding the stratum.

In this technique, a probe, or sonde, containing a neutron source is drawn through a borehole and a detector in the sonde measures the energy and/or intensity of radiation returning from the strata. Oil, gas, water, and various other geological formations possess a distinctive radiation signature that permits identification of the make-up of the strata.

Borehole detectors of high-energy photons such as gamma rays and X-rays returning from the strata employ specially grown scintillation crystals which produce a flash of visible or near-visible photons when a high-energy photon interacts with atoms in the crystal. This flash of visible or near-visible photons is sensed in a photomultiplier tube (PMT) which is adjacent to the scintillation crystal and the PMT produces an electrical signal indicative of the flash intensity. The flash intensity is dependent upon the energy of the incident high-energy photon.

These electrical signals are transmitted to the surface where they are analyzed. Analysis of the time and energy spectrum distributions of the detected high-energy photons provides information about subsurface conditions.

Two types of neutron sources are generally used in the downhole probe. One type employs radioactive sources, such as americium/beryllium or californium, that continuously emit neutrons. The other type of neutron source employs a pulsed 14 MeV neutron generator.

Each of these types of neutron sources has its disadvantages. Radioactive sources require special licenses in every country where the source will be used. Radioactive sources require bulky shielding and complicated transportation arrangements and are occasionally lost downhole, which can render the hole unusable due to radiological concerns. Radioactive sources do, however, possess the significant advantage of having a well-known neutron emission rate.

Pulsed generators are safer to use and permit a wider variety of downhole measurements. However, pulsed generators do not emit neutrons at a constant rate. Therefore, a neutron monitor must be used downhole to monitor a pulsed neutron generator. The neutron monitor measures the number of neutrons emitted by the neutron generator, not the number of neutrons returning from the strata. Information concerning the number of neutrons emitted by the neutron generator is used to compensate calculations for variation in the neutron output of the neutron generator.

Further background on conventional subsurface surveying and surveying equipment is provided in U.S. Pat. No. 5,008,067, issued to John B. Czirr on Apr. 16, 1991. The entire contents of the '067 patent are incorporated herein by reference.

The neutron monitoring technique disclosed in the '067 patent is based on the $^{16}O$ (n,p) $^{16}N$ reaction. In this reaction, a neutron n from a neutron generator enters and reacts with an oxygen containing scintillation material according to the following reaction:

$$n + {}^{16}O \rightarrow {}^{16}N + p \qquad \text{Equation (1)}$$

The $^{16}N$ decays rapidly due to its seven second half-life. The decay of the $^{16}N$ results in the production of high-energy gamma rays and electrons. The high-energy gamma rays and electrons cause scintillation material in the neutron monitor to scintillate, that is, to produce a flash of light. This light is detected, converted into an electrical signal, and amplified to provide an indication of the neutron output of the neutron generator.

Unfortunately, the scintillating materials disclosed in the '067 patent, bismuth germanate (BGO) and lithium glass, have numerous disadvantages. Bismuth germanate does not scintillate at the high temperatures frequently encountered downhole. Lithium glass has a low atomic number and is thus not well-suited to detect the gamma rays and electrons produced during $^{16}N$ decay.

One possible material choice for a neutron monitor is cerium-activated gadolinium silicate. Unfortunately, the high thermal neutron capture probability of cerium-activated gadolinium silicate causes the gadolinium silicate to be unacceptably influenced by background thermal neutrons.

Other scintillating materials that have been considered for downhole use do not effectively scintillate at the high temperatures frequently encountered downhole.

Thus, there is a real need for neutron detection materials which can efficiently operate at the temperatures encountered in the course of subsurface surveying and which can effectively detect high-energy gammas and electrons resulting from $^{16}N$ decay.

Another problem in the design of subsurface surveying equipment relates to the choice of a scintillation crystal to detect photons coming from the strata. The borehole environment is hostile to electrical and mechanical equipment in that the borehole environment is wet, contains corrosive materials, and experiences high pressures and temperatures. Furthermore, the space in a borehole is very limited. In addition, because the maintenance and operation of a borehole drilling rig is extremely expensive, the time spent on subsurface surveying has to be minimized. These conditions and requirements impose severe constraints on the materials and construction of a subsurface surveying sonde.

A scintillation crystal to detect photons coming from the strata should ideally have the following properties:
(1) a high density to maximize the number of interactions between high-energy photons coming from the strata and the scintillation crystal;
(2) fast decay of the scintillation process following a gamma ray or X-ray interaction and low afterglow;

(3) high scintillation light output linearly related to incoming photon energy to provide adequate energy resolution and measurement;
(4) high transparency to minimize attenuation of the light flashes within the scintillation crystal;
(6) insensitivity of the scintillation process to temperature changes; and
(7) mechanical strength and resistance to the corrosive effects of the materials encountered in the borehole environment.

Many scintillator materials fail to provide an acceptable combination of these properties. Thus, there is a need for improved scintillation crystals to detect photons coming from the strata.

SUMMARY OF THE INVENTION

It is an object of the invention, therefore, to provide an improved neutron monitor for subsurface surveying applications.

It is another object of the invention to provide a neutron monitor that can effectively operate at the temperatures encountered in a borehole environment.

Yet another object of the invention is to provide a neutron monitor for subsurface surveying applications which has a high density and high atomic number.

Another object of the invention is to provide a neutron monitor which effectively discriminates against background radiation.

A further object of the invention is to provide an improved photon detector for subsurface surveying applications.

A further object of the invention is to provide an improved way of shielding a subsurface surveying sonde from thermal neutrons.

According to a first aspect of the invention there is provided an improved neutron monitoring apparatus for subsurface surveying. The apparatus includes a sonde which is configured to move through a borehole. The sonde includes a neutron generator that emits neutrons into the subsurface formation. A crystal detector in the sonde monitors the neutron output of the neutron generator. The crystal detector comprises a cerium-activated yttrium silicate crystal, yttrium aluminate crystal, lanthanum phosphate crystal, or lutetium phosphate crystal. The sonde can be provided with a borated stainless steel pressure casing to shield the internals of the sonde from thermal neutrons.

According to another aspect of the invention there is provided an improved photon detection apparatus to survey subsurface formations. The apparatus includes a sonde configured to move through a borehole and a crystal photon detector to detect photons coming from the subsurface formations. The crystal photon detector comprises a cerium-activated lanthanum phosphate crystal or lutetium phosphate crystal.

BRIEF DESCRIPTION OF THE DRAWING

A preferred embodiment of the invention will be described in detail below with reference to the accompanying drawing, wherein.

DETAILED DESCRIPTION OF THE PREFERRED EMBODIMENT

Figure 1:
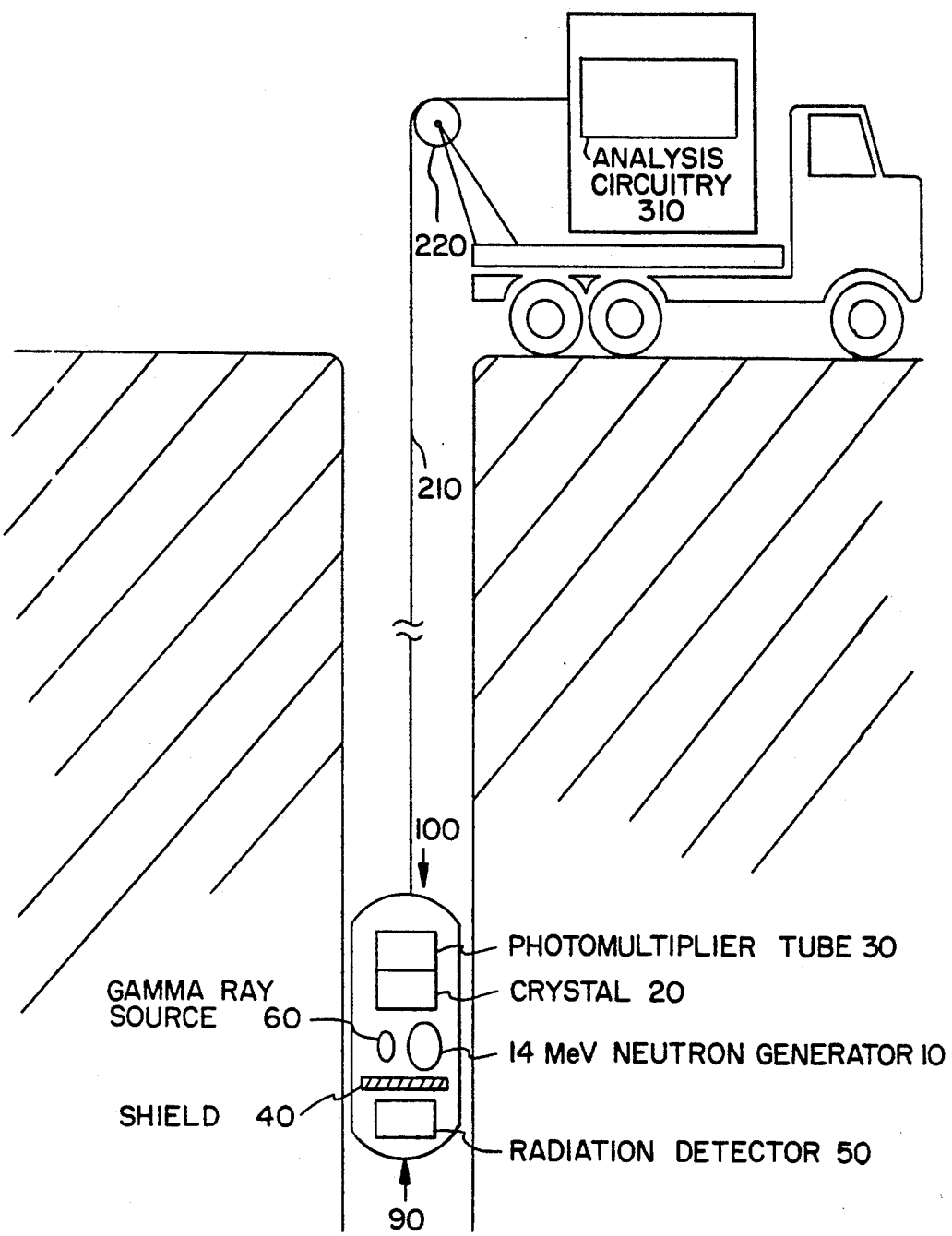
FIG. 1 illustrates a preferred embodiment of the instant invention.

It has been discovered that certain materials are particularly well-suited for use as a neutron monitor in subsurface surveying applications. These materials effectively scintillate at the high temperatures encountered underground and/or effectively detect high-energy gammas and electrons resulting from decay. These materials are:
(1) yttrium silicate—$Y_2SiO_5$
(2) yttrium aluminate—$YAlO_3$
(3) lanthanum phosphate—$LaPO_4$
(4) lutetium phosphate—$LuPO_4$ Each of these materials can be cerium activated.

Because gamma detection efficiency increases with the square of the atomic number Z, lutetium phosphate and lanthanum phosphate, and most particularly lutetium phosphate, are particularly good at detecting high-energy gammas and electrons resulting from $^{16}N$ decay. Lutetium phosphate and lanthanum phosphate also have the advantage of producing light at frequencies which can be easily detected by PMTs, when activated by trivalent cerium.

General properties and preparation of yttrium silicate are described in "The Afterglow of Some Old and New $Ce^{3+}$—Activated Phosphors," *Journal of The Electrochemical Society*, 116 (1969) 871. General properties and preparation of yttrium aluminate are described in "$YAlO_3$: Ce-fast-acting scintillators for detection of ionizing radiation," *Nuclear Instruments and Methods in Physics Research*, B58 (1991) 291. General properties and preparation of lanthanum phosphate are described in "Investigation of Some $Ce^{3+}$—Activated Phosphors," *The Journal of Chemical Physics*, 47 (1967) 5139. General properties and preparation of lutetium phosphate are described in "Anomalously small 4f-5d oscillator strengths and 4f-4f electronic Raman scattering cross sections for $Ce^{3+}$ in crystals of $LuPO_4$," *Physical Review B*, 40 (1989) 4143 and "Intensities of electronic Raman scattering between crystal-field levels of $Ce^{3+}$$j$ in $LuPO_4$: Nonresonant and near-resonant excitation," *Physical Review B*, 40 (1989) 4132. Further information regarding making rare earth phosphates is set forth in "Synthesis and Single-Crystal Growth of Rare-Earth Orthophosphates," *Journal of the American Ceramic Society*, 47 (1964) 257. The entire contents of all of these publications are incorporated herein by reference.

FIG. 1 illustrates a preferred embodiment of the invention. FIG. 1 illustrates a logging sonde 100 for emitting high energy neutrons into a subsurface formation and for detecting radiation resulting from the bombardment of the subsurface formation with the high energy neutrons. The sonde 100 includes a pressure casing 90 which protects equipment inside the sonde from the borehole environment. The sonde 100 is suspended in a borehole by an armored multi-conductor cable 210. The operation of the sonde 100 is controlled from the surface by signals sent downhole via cable 210. The sonde 100 is moved within the borehole by paying cable 210 out and reeling it back in over a wheel 220.

The sonde 100 includes a neutron generator 10 to produce neutrons to bombard the formation as the sonde 100 travels within the borehole. A radiation detector 50 detects radiation coming from the formation. A shield 40 is provided to shield the radiation detector 50 from the neutron generator 10 so that radiation detector 50 detects radiation coming from outside the sonde 100 and not radiation coming directly from neutron generator 10.

In the FIG. 1 embodiment, the neutron generator 10 is a pulsed-type neutron generator which generates discrete bursts of high energy neutrons at, e.g., 14 MeV and the radiation detector 50 detects gamma radiation; however, it is understood that other types of neutron generators and radiation detectors can be used in the invention.

The neutron generator 10 is monitored by a neutron detector, or neutron flux monitor, comprised of a scintillation crystal 20 and a photomultiplier tube (PMT) 30. Scintillation crystal 20 is optically coupled to PMT 30. The crystal 20 is an yttrium silicate crystal, an yttrium aluminate crystal, a lanthanum phosphate crystal, or a lutetium phosphate crystal. The crystal 20 can be activated, for example, with cerium.

Electrical power for the sonde 100 is supplied via the cable 210 from the surface. The sonde 100 includes circuitry (not illustrated) for feeding power at appropriate voltage and current levels to the neutron generator 10. The sonde 100 may also include a pulse-height analyzer (not illustrated) to process the output pulses from the PMT 30.

In the preferred embodiment, the pressure casing 90 of the sonde 100 is fabricated from commercially available borated stainless steel to shield the scintillating material inside of the sonde from thermal neutrons coming from outside the sonde. Thermal neutrons may produce gammas in the scintillation material as a result of thermal neutron capture in the scintillation material. Because these gammas are in the energy region of interest, their production in the scintillation material results in unwanted background signals.

Shielding the inside of the sonde from thermal neutrons coming from outside the sonde greatly reduces the thermal neutron flux inside of the sonde and thus greatly reduces the production of gammas in the scintillation material. Use of borated stainless steel in the pressure casing 90 eliminates the need to provide a bulky thermal neutron shield inside of the sonde and thus makes more space available inside the sonde for scintillator materials.

At the surface, the analysis circuitry 310 comprises various electronic circuits to store and process the data received from the downhole equipment. These circuits can be implemented by special purpose hardware or by a general purpose computer. Signals received from the PMT 30, or from the pulse-height analyzer, are stored and processed by analysis circuitry 310. The analysis circuitry 310 also analyzes the signals indicative of the radiation detected by radiation detector 50 and generates therefrom information concerning the make-up of the subsurface formation and any hydrocarbons that the formation may contain.

The analysis circuitry 310 uses the signals from PMT 30 to calculate the number of neutrons emitted by the neutron generator 10. Information concerning the number of neutrons emitted by the neutron generator 10 is used to compensate calculations involving the incoming radiation (detected by radiation detector 50) for variation in the neutron output of neutron generator 10.

General background information on analysis and processing of sonde data is provided in U.S. Pat. No. 5,025,151, issued to Charles L. Melcher on Jun. 18, 1991, the entire contents of which are incorporated herein by reference. The '151 patent also provides information regarding the design of mechanical and electrical equipment associated with radiation detection.

A particular advantage of the crystal materials used in the invention is their high level of light output and their ability to provide a high light output at the elevated temperatures encountered downhole. By way of example, the light output of a single-crystal cerium-activated yttrium silicate scintillator is 5.5 times that of bismuth germanate at room temperature, and 1.66 times the light output of room temperature bismuth germanate when the yttrium silicate is at 160 degrees centigrade.

As the sonde 100 is moved within the borehole, the sonde will be subjected to varying environmental conditions, for example, varying temperatures. These varying conditions cause the signal output of the neutron flux monitor (comprised of scintillation crystal 20 and PMT 30) to vary independently of the actual neutron output of neutron generator 10. To improve accuracy, it is desirable to provide suitable gain stabilization equipment and processing to compensate for the influence of environmental conditions on the signal output of the neutron flux monitor.

In the preferred embodiment, such compensation is provided by placing a high energy gamma ray source 60 near the neutron flux monitor to produce a narrow, monoenergetic signal in a convenient region of the neutron flux monitor pulse-height spectrum. Variation in this narrow, monoenergetic signal is attributed to varying environmental conditions downhole and is thus used by the analysis circuitry 310 to compensate for the influence of varying environmental conditions downhole. Both the wide-energy-band neutron flux monitor output and the radiation detector 50 output can be thus compensated.

Gamma ray sources suitable for use as high energy gamma ray source 60 include alpha/Be-9 and alpha/C-13 sources. Convenient sources of alpha particles of suitable energy for the alpha/Be-9 and alpha/C-13 sources are Am-241, Pu-239, and Pu-238.

In order to determine the response function of yttrium based scintillators to these monoenergetic gamma rays produced by high energy gamma ray source 60, I made Monte Carlo calculations that indicate that the response function for a 2 cm diameter yttrium-based crystal would be particularly simple. That is, the response function would consist primarily of a double escape peak, instead of the expected and more typical full energy peak plus a single escape peak plus a double escape peak. Such a simple response function is particularly advantageous for gain stabilization processing.

Later measurements indicated an unexpected order of magnitude improvement in the high-energy threshold counting rate of yttrium silicate as compared to the counting rate of glass scintillator materials. Yttrium aluminate has characteristics similar to those of yttrium silicate.

An expected advantage of yttrium silicate is its high resistance to radiation damage resulting from the intense radiation emitted from the nearby source(s) present in the sonde. Rare-earth silicates are particularly insensitive to the high irradiation doses expected in downhole applications. Because the chemical configuration of yttrium is similar to the configuration of the rare-earths, yttrium silicate is expected to prove to be similarly insensitive to radiation damage.

Because of their gamma detection properties and suitability to the subsurface environment, lanthanum phosphate and lutetium phosphate, and most particularly lutetium phosphate, can be employed as gamma detectors in other subsurface surveying applications, apart from the detection of gammas resulting from the decay of $^{16}N$. For example, the radiation detector 50 of FIG. 1 can use a lanthanum phosphate crystal or a lutetium phosphate crystal as a scintillator. These crystals can be cerium activated.

Although the invention is described above with respect to certain preferred embodiments, the scope of the invention is not limited to the specific embodiments described above. Variations and modifications will be apparent to those skilled in the art after receiving the teachings of the above disclosure. For example, the instant invention can employ the biasing and timing techniques disclosed and claimed in the above-cited '067 patent. The neutron detection materials described above can also be used in neutron detection applications other than downhole neutron generator monitoring. Therefore, the scope of the invention is defined with reference to the following claims.

What is claimed is:

1. An apparatus to survey subsurface formations, said apparatus comprising:
   (a) a sonde configured to move through a borehole, said sonde including a neutron generator that emits neutrons into said subsurface formations; and
   (b) a lanthanum phosphate crystal detector, connected to said sonde, to monitor the neutron output of said neutron generator.

2. An apparatus as set forth in claim 1 wherein said lanthanum phosphate crystal is cerium activated.

3. An apparatus as set forth in claim 1 wherein said sonde includes a borated stainless steel pressure casing.

4. An apparatus as set forth in claim 1 wherein said apparatus further comprises a means for compensating for the influence of environmental conditions on said lanthanum phosphate crystal detector.

5. An apparatus to survey subsurface formations, said apparatus comprising:
   (a) a sonde configured to move through a borehole, said sonde including a neutron generator that emits neutrons into said subsurface formations; and
   (b) a lutetium phosphate crystal detector, connected to said sonde, to monitor the neutron output of said neutron generator.

6. An apparatus as set forth in claim 5 wherein said lutetium phosphate crystal is cerium activated.

7. An apparatus as set forth in claim 5 wherein said sonde includes a borated stainless steel pressure casing.

8. An apparatus as set forth in claim 5 wherein said apparatus further comprises a means for compensating for the influence of environmental conditions on said lutetium phosphate crystal detector.

9. An apparatus to survey subsurface formations, said apparatus comprising:
   (a) a sonde configured to move through a borehole, said sonde including a neutron generator that emits neutrons into said subsurface formations; and
   (b) an yttrium silicate crystal detector, connected to said sonde, to monitor the neutron output of said neutron generator.

10. An apparatus as set forth in claim 9 wherein said yttrium silicate crystal is cerium activated.

11. An apparatus as set forth in claim 9 wherein said sonde includes a borated stainless steel pressure casing.

12. An apparatus as set forth in claim 9 wherein said apparatus further comprises a means for compensating for the influence of environmental conditions on said yttrium silicate crystal detector.

13. An apparatus to survey subsurface formations, said apparatus comprising:
    (a) a sonde configured to move through a borehole, said sonde including a neutron generator that emits neutrons into said subsurface formations; and
    (b) an yttrium aluminate crystal detector, connected to said sonde, to monitor the neutron output of said neutron generator.

14. An apparatus as set forth in claim 13 wherein said yttrium aluminate crystal is cerium activated.

15. An apparatus as set forth in claim 13 wherein said sonde includes a borated stainless steel pressure casing.

16. An apparatus as set forth in claim 13 wherein said apparatus further comprises a means for compensating for the influence of environmental conditions on said yttrium aluminate crystal detector.

17. An apparatus to survey subsurface formations, said apparatus comprising:
    (a) a sonde configured to move through a borehole, said sonde having a borated stainless steel pressure casing, said sonde including a neutron generator that emits neutrons into said subsurface formations; and
    (b) a scintillation detector, connected to said sonde and shielded by said borated stainless steel pressure casing, to monitor the neutron output of said neutron generator.

* * * * *